United States Patent [19]
Barvesten

[11] Patent Number: 5,940,773
[45] Date of Patent: Aug. 17, 1999

[54] ACCESS CONTROLLED TERMINAL AND METHOD FOR RENDERING COMMUNICATION SERVICES

[75] Inventor: Mats Olof Barvesten, Lund, Sweden

[73] Assignee: Ericsson Inc., Research Triangle Park, N.C.

[21] Appl. No.: 08/529,154

[22] Filed: Sep. 15, 1995

Related U.S. Application Data

[63] Continuation of application No. 08/149,528, Nov. 9, 1993, abandoned.

[30] Foreign Application Priority Data

Nov. 9, 1992 [SE] Sweden .................................. 9203351

[51] Int. Cl.$^6$ ...................................................... H04Q 7/32
[52] U.S. Cl. ........................ 455/558; 379/91.01; 379/153; 455/38.2
[58] Field of Search ................... 455/558, 38.2; 379/91.01, 153; 235/380

[56] References Cited

U.S. PATENT DOCUMENTS

| 4,815,123 | 3/1989 | McGough | 379/153 |
| 5,203,014 | 4/1993 | Wagai et al. | 455/38.2 |
| 5,266,782 | 11/1993 | Alanärä et al. | 379/91 |

FOREIGN PATENT DOCUMENTS

| 0 281 728 | 9/1988 | European Pat. Off. . |
| 0 301 740 | 2/1989 | European Pat. Off. . |
| 0 448 369 | 9/1991 | European Pat. Off. . |

Primary Examiner—William Cumming
Attorney, Agent, or Firm—Burns, Doane, Swecker & Mathis, L.L.P.

[57] ABSTRACT

An arrangement for rendering services such as for example telephone communication, data communication and so on comprising a terminal unit and an access unit, the terminal unit comprising a terminal-unit-identification code ($PIN_t$) which is stored in the terminal unit and the access unit comprising a first access identification code (IMSI), terminal unit as well as an access unit being lockable. In the terminal unit are furthermore first access identification codes for a given number of access units (SIM) stored wherein upon starting up of the device involving contact between terminal unit and actual access unit (SIM) with a certain access unit identification code ($IMSI_c$), identification code ($IMSI_c$) of the access unit is compared to in the terminal unit stored first access identification code(s) ($IMSI_s$) in the terminal unit, correspondence between stored access identification code ($IMSI_s$) and actual access unit identification code ($IMSI_c$) leading to locking up of the terminal unit whereas non-correspondence between stored and actual access unit identification codes ($IMSI_s \neq IMSI_c$) respectively at least the terminal unit identification code ($PIN_t$) must be given.

13 Claims, 2 Drawing Sheets

ACCESS CONTROLLED TERMINAL AND METHOD FOR RENDERING COMMUNICATION SERVICES

This application is a continuation of application Ser. No. 08/149,528, filed Nov. 9, 1993, abandoned.

TECHNICAL FIELD

The present invention relates to an arrangement for rendering services such as telephone communication, data communication etc. Such arrangements may under a lot of circumstances easily be abused and are very attractive to steal which might have serious consequences. This is the case as well if e.g. the access units are not lockable or are not locked as well as if the terminal unit is not lockable or is not locked so that they merely can be used by users who really should have access to the one or the other of the units. This is e.g. the case with mobile telephones where the subscription is not related to a particular mobile telephone or terminal unit but is related to a separate card. Then a terminal unit or a telephone may be used with any card. If on the other hand the access unit, or the card, is not locked, anyone may use the card and therethrough also charge the subscription. One way to solve this problem, i.e. to protect the terminal unit as well as the access unit is to implement a "lock" in the terminal unit as well as in the access unit wherethrough a user has to enter a code to "unlock" the terminal unit and a further code to "lock up" the card and thus get access to the subscription. This however is tedious since two different codes have to be entered each time upon use which is very inconvenient, among others since it may be difficult to remember the increasing number of codes which are necessary in the society and also because it is annoying to, each time, which may be a large number of times, having to enter two codes. It is therefore very probable that the user inactivates one or the other of the codes or in the worst case both identification codes in order to be able to get a quick access to his phone. The user then runs the risk that the device, or one of the units comprised by the device or arrangement, is abused or stolen.

STATE OF THE ART

Devices as referred to above are known in the prior art but as mentioned above they suffer the drawback that either two different codes have to be entered upon every activation of the terminal or it is simply not bothered to lock e.g. the terminal, but also in some cases, the card or the access unit. This is for example the case with the digital GSM-system. In this system the subscription is on a separate so called SIM-card (Subscriber Identity Module). In this case the terminal unit, or the telephone, is very attractive for stealing since the SIM-card which should have access to the telephone simply can be exchanged through another SIM-card and therethrough the telephone may be used freely by users who should not have access to the, in this case, telephone. This is particularly the case when the terminal units are intended to be used by a particular user or a particular group of users or when the terminal quite simply is stolen. In the known device the access unit, or the SIM-card, comprises a so called PIN-code (Personal Identification Number) whereas the terminal unit, or the telephone, in turn comprises another PIN-code so that in order to get a full protection of terminal unit (telephone) as well as access unit (card), both codes must be entered at every activation of the terminal unit or the telephone. This leads consequently to a very awkward handling of the device.

In known analogue mobile telephone systems the subscription is programmed into the telephone terminal. This is done with special equipment and is handled by authorized personnel which is picked out and controlled by the operator, therefore the same problems do not arise in this case.

SUMMARY OF THE INVENTION

The object of the present invention is to provide an arrangement for rendering services wherein a terminal unit as well as an access unit are safe against thefts and may not easily be abused at the same time as the device is easy to use and in the normal case do not require a double entering of codes and wherein particularly advantageous no entering or giving of codes at all is necessary to give the owner or the prioritized user access to the device without the device therefore getting less safe or protected against thefts. A further object with the invention is to provide an arrangement which permits fast and easy access and wherein the simplified access may be given to one or more users depending on what is desired.

These and other objects are achieved through an arrangement for rendering services such as telephone communication, data communication, e t c, comprising a terminal unit and an access unit, the terminal unit comprising terminal unit identification means ($PIN_t$) being stored in the terminal unit and the access unit comprising first access-unit-identification means (IMSI) in the form of a code or similar, terminal unit as well as access unit being lockable, wherein in the terminal unit furthermore are stored first access-unit-identification means ($IMSI_{s,i}$) for a given number (n) of access units (SIM), wherein upon starting up of the arrangement involving contact between the terminal unit and an access unit (SIM) with a certain access-unit-identification means ($IMSI_c$), the code of the identification means ($IMSI_c$) of the access unit is compared with in the terminal unit stored code(-s) for access-unit-identification means ($IMSI_{s,i}$), wherein correspondence between stored access-unit-identification means ($IMSI_{s,i}$) and actual access-unit-identification means ($IMSI_c$) leads to locking up of the terminal unit whereas upon non-correspondence between stored and actual access-unit-identification means at least the terminal-unit-identification code ($PIN_t$) is to be given.

In one aspect of the invention a second access-unit-identification means ($PIN_c$) of the access unit (SIM) can be activated or inactivated, i.e. a personal identification number of the card. If the actual access identification code ($IMSI_c$) does not correspond to any first access-unit-identification code ($IMSI_{s,i}$) stored in the storage of the terminal unit and if the second access-unit-identification means are activated and comprises a code ($PIN_c$), this code has to be given to lock up or activate the actual access unit.

This code, $PIN_c$ could e.g. be given manually by the user.

In another aspect of the invention may also the second access-unit-identification means ($PIN_c$) be stored in the terminal unit. If then the actual first access identification code corresponds to a stored access identification means ($IMSI_s = IMSI_c$), the terminal unit automatically transfers the second access-unit-identification means ($PIN_c$) to the access unit so that the arrangement can be used without the second access-unit-identification code ($PIN_c$) having to be given by the user.

In one aspect of the invention, and if the second access-unit-identification means ($PIN_c$) are not stored in the terminal unit, correspondence between in the terminal unit stored first access-unit-identification and the actual access-unit-identification means, the access unit is locked up through the giving of $PIN_c$, i.e. the second access-unit-identification means/code.

In a further aspect of the invention and with non-correspondence between stored and actual first access-unit-identification code, the terminal unit as well as the access unit are unlocked or activated if either the terminal-identification code or the second access-unit-identification code is given.

In still another aspect, non correspondence between stored and actual first access-unit-identification codes ($IMSI_c \neq IMSI_s$) both the terminal identification code ($PIN_t$) and the second access-identification-code ($PIN_c$) have to be given for activation of the arrangement.

In one aspect of the invention, the terminal unit comprises a mobile telephone, and particularly the access unit comprises a card.

More particularly even, the access unit comprises a Subscriber Identity Module-card which defines the subscription of the mobile telephone.

In a further aspect of the invention the first access-unit-identification code of at least one subscription which should have access to the terminal unit (or telephone unit) is stored in the terminal unit, wherein the first access-unit-identification code e.g. is stored in an EEPROM-storage in a manner known per se, whole of it, part of it, ciphered, random number generated with rest or similar.

In yet another aspect of the invention one or several further access-unit-identification codes are stored in the storage of the terminal unit, partly, as a whole, ciphered or similar.

In still another aspect of the invention at least one second access-unit-identification code is stored, ciphered or similar in a storage in the terminal unit.

In a further aspect of the invention the storing of the first access-unit-identification code takes place automatically or in yet another aspect of the invention manually via e.g. a pushbutton device or similar.

In one aspect of the invention at least one second access identification code is stored in a storage in the terminal unit in a way similar to the storing of the first access unit identification code.

In still another aspect of the invention at least one to an access unit belonging telephone number is stored in a terminal storage or in a storage in the card so that this is picked up from the storage and shown on a display when the arrangement is unlocked.

Another aspect of the invention relates to an arrangement through which it is possible to, if so desired, obtain information about identification number (for example telephone number) or codes belonging to access units which have been acceded simplified access.

BRIEF DESCRIPTION OF THE DRAWINGS

The invention will in the following be further described with reference to the accompanying drawings in an explanatory and by no means limiting way, wherein FIG. 1 schematically illustrates a terminal unit and an access unit in the form of a telephone with a card, FIG. 2 schematically illustrates an example of a flow diagram with steps which are gone through upon activation of the terminal for "locking up" of terminal unit as well as access unit (in the illustrated case a telephone and a card).

DETAILED DESCRIPTION OF THE INVENTION

Figure 1:
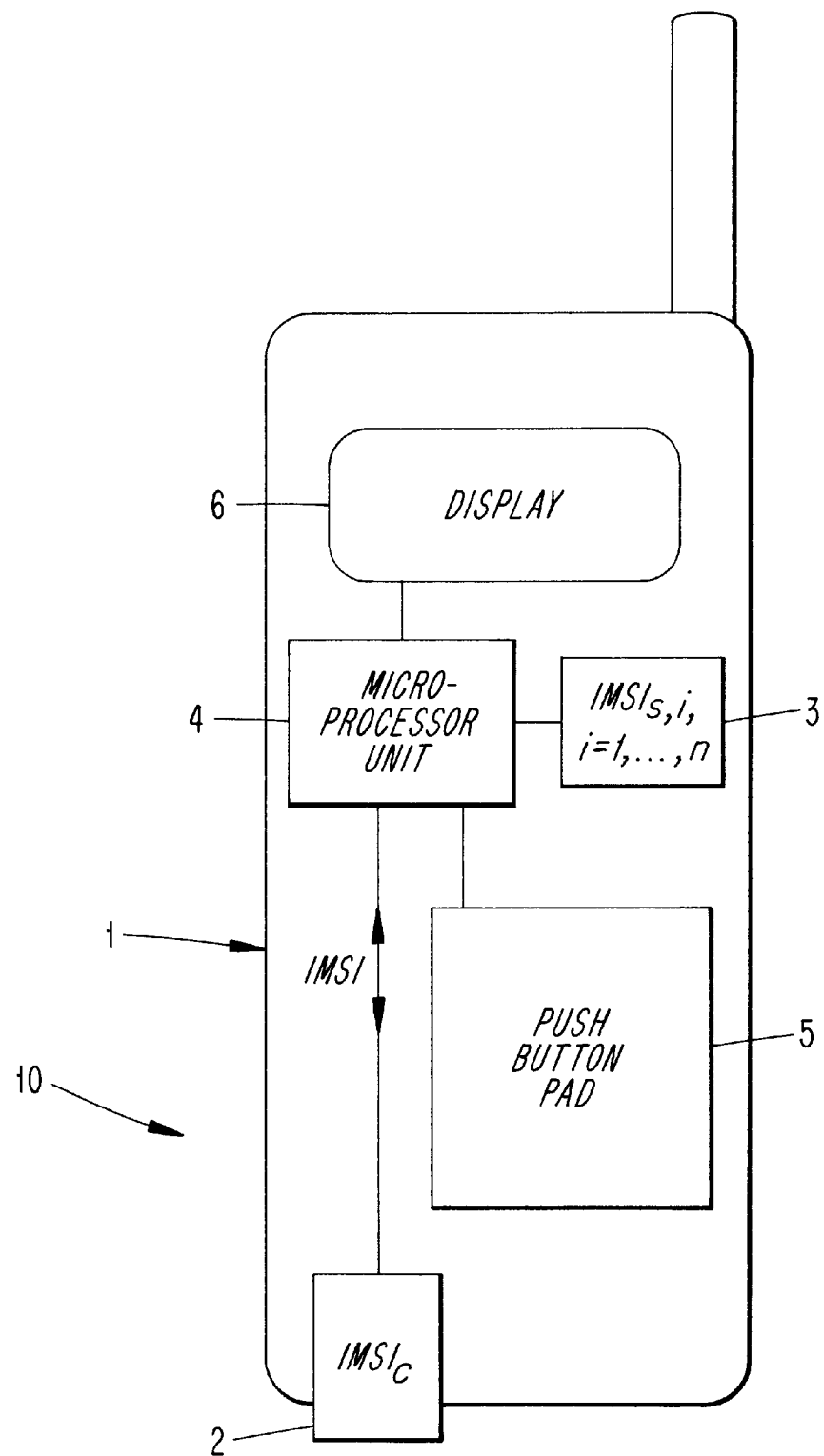

In the embodiment shown in FIG. 1 a device or an arrangement 10 is shown wherein the terminal unit comprises a mobile telephone 1 and the access unit comprises an electronic card 2 comprising the subscription. The device furthermore comprises a push button means 5, a memory 3 and a micro-processor unit 4. In the display 6 among others telephone numbers are shown. In the shown embodiment the device refers to the cellular so called GSM-mobile telephone system, particularly the CME 20-system (Ericsson). In this context it is also referred to recommendation GSM 11.11. In the shown embodiment the card 2 with an electronic memory comprises a so called SIM-card (Subscriber Identity Module) further described in Recommendation GSM 02.17 which contains the information which un-ambiguously identifies the subscriber. In the SIM-card 2 the so called IMSI-code (International Mobile Subscriber Identity) is stored. A mobile station, MS, which for example may be a station mounted on a vehicle, a portable station or a hand carried station may only be used if a valid IMSI-code is present. In the cases when the terminal unit or the telephone 1 is not locked or secured by a so called EIR-register (Equipment Identity Register) (not yet in use) which in one way can be seen as a different alternative to the present invention as theft protection is concerned, it would be easy to abuse or steal the terminal unit or the telephone 1. Upon starting up or activation of the telephone 1, the telephone 1 and the SIM-card 2 communicate with each other. The IMSI-code for the SIM-card(-s) 2 is (are) to be stored in a memory in the phone, e.g. in an EEPROM-storage. The IMSI-code may then be stored in a number of different ways which are known per se, e.g. the whole of it, partly, non-ciphered or ciphered or random numbered generated with calculation of rest or any other method. The storing may take place either automatically or manually. According to an advantageous embodiment of the invention it is possible to, apart from storing of the identity of the own SIM-card, i.e. its IMSI-code, also store the IMSI-codes of a number of other SIM-cards which should have a simplified or prioritized access to the terminal unit or the telephone 1.

Figure 2:
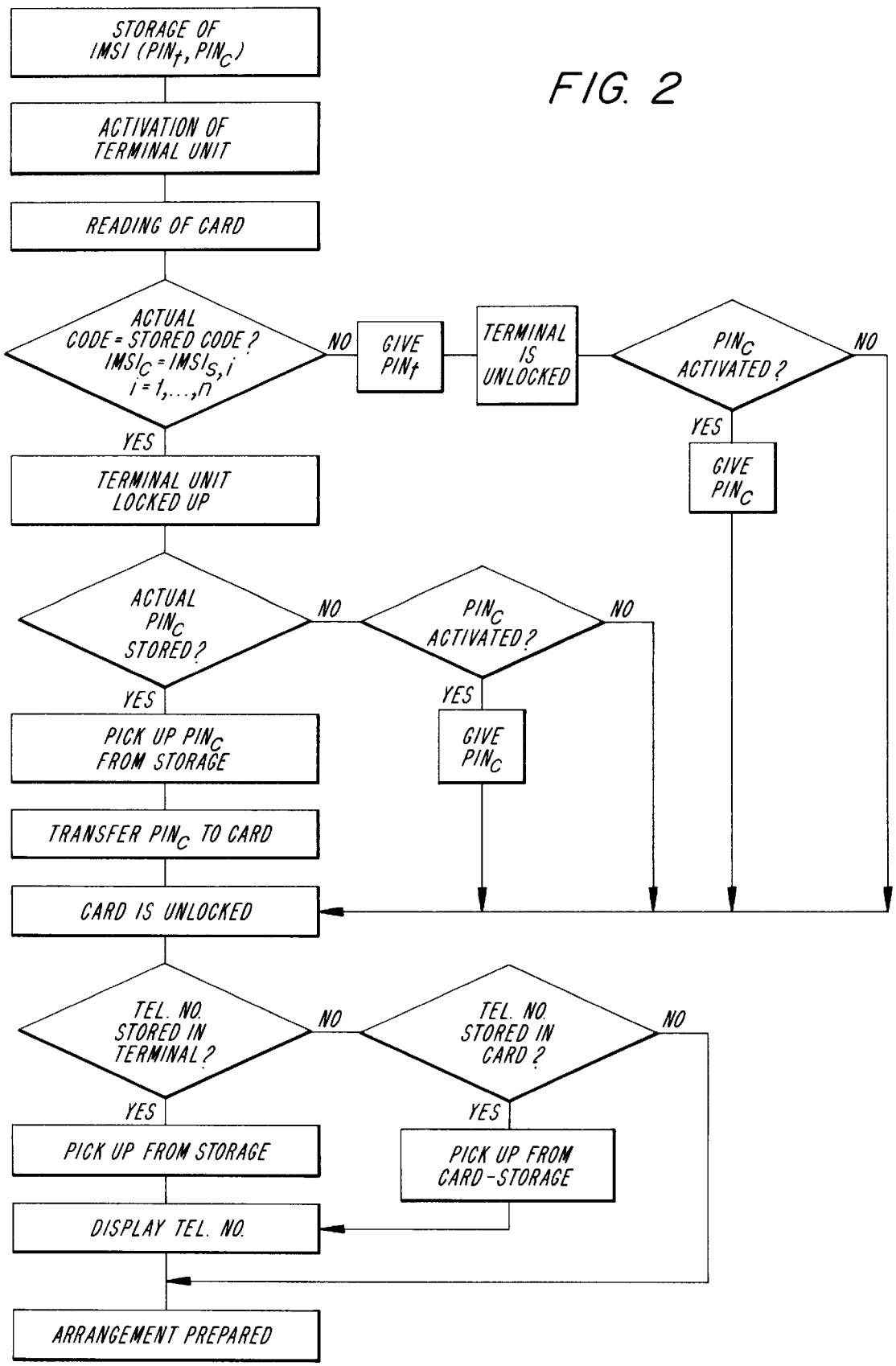

Particularly under reference to the flow diagram of FIG. 2 the sequence will in the following be described wherein, after one or more IMSI-codes have been stored in a storage of a terminal unit as well as possibly also $PIN_t$ and $PIN_c$ -codes, the terminal is activated or started up wherein a number of different possibilities are possible depending on the actual IMSI-code having been stored or not.

Upon activation of the telephone, wherein either a card already is present in the telephone 1 or a new one has been introduced, the actual $IMSI_c$-code is sent to the telephone 1 (according to the GSM-recommendation) via the microprocessor 4, as stated above, where it is compared to in the telephone 1 stored $IMSI_{s,i}$-code(-s). If $IMSI_c$ corresponds to any $IMSI_s$-code being stored in the telephone 1, the telephone is started up without requiring any further measure to be taken or without asking for any further code. If on the other hand there is no correspondence between the codes, the telephone 1 demands a $PIN_t$-code for the terminal unit or the telephone 1.

Thus, on every occasion of activation of the telephone 1, in the storage 3 stored code(-s) ($IMSI_{s,i}$) are compared with received code ($IMSI_c$) of the actual SIM-card. A so called PIN-code for the SIM-card may likewise be stored in the storage 3 in a way similar to that of the IMSI-code(-s). In the storage 3 of the terminal unit (telephone) are one or more IMSI-codes stored and also a $PIN_t$, i.e. a Personal Identification Number for the terminal. According to different embodiments may furthermore $PIN_c$ of those cards whose $IMSI_c$-code(-s) have been stored, be stored therein as well as a telephone number for the corresponding subscription. This is however dependent on desires and requirements and provisions and merely indicate advantageous embodiments. Now returning to the case wherein the actual $IMSI_c$-code does correspond to the stored $IMSI_s$-code and the terminal is locked up. It is thereafter investigated if the actual $PIN_c$-code of the card is stored. If yes, the $PIN_c$-code of the actual card is picked up from the storage 3 whereupon it is transmitted to the card 2 which thereafter is locked up and then the telephone 1 as well as the card (access unit) 2 are unlocked and the device 10 is as far as locking is concerned ready to be used or open for communication. In this case, consequently, no entering of any code is required of the user. (If $PIN_c$ is stored (and activated), this code is requested and will then have to be entered or given).

If however the actual $IMSI_c$-code does not correspond to any stored $IMSI_s$-code the terminal unit 1 or the telephone 1 requests a $PIN_t$-code for the terminal. When this code is given the terminal 1 is unlocked. Thereafter is asked if the $PIN_c$-code for the card is activated. If not, the card is already unlocked and thus was not locked. If yes, the $PIN_c$-code is requested and when this is given, the card is locked up and the device is ready to be used as far as locking is concerned. If on the other hand the actual IMSI-code has corresponded to a stored $IMSI_s$-code it is also possible that the $PIN_c$-code of the actual card has not been stored. The terminal is in this case, as already mentioned above, already unlocked. Then it is examined if any $PIN_c$-code for the card is activated. If yes, this is given whereupon the card is locked up. If not, the card consequently has not been locked and is therefore already unlocked and the device is ready to be used as far as locking is concerned. Thus it is possible for an authorized user, i.e. a user who should have access to telephone as well as to card not to enter any code at all but that the card as well as the terminal are unlocked automatically. If however the actual $IMSI_c$-code has not been stored in the terminal it is possible to get access by entering PIN-codes for terminal and card. Eventually these codes could be associated with each other and for example consist of one and the same code.

According to a preferred embodiment at least one $IMSI_c$-code as well as also PIN-codes for card as well as for terminal are stored in the storage memory. To avoid the storage of the PIN-code of the card it might also be possible, as mentioned above, to associate this with the PIN-code of the terminal. According to a preferred embodiment is however the $PIN_c$-code of the card stored in a ciphered form in the memory 3.

The cards may for example comprise cards with an electronical memory but also cards with a magnetical memory or other alternatives are possible.

According to a preferred embodiment it is possible, in case the $IMSI_c$-code of an actual card is stored in the storage 3 of the terminal 1, to show for example the telephone number of the actual subscription or the SIM-card which can be useful since this in no other way is visible. Then it is examined, after unlocking of the card, if the telephone number of the card is stored in the terminal. If this is the case, it is picked up from the storage and is shown on the display 6. If the telephone number is not stored in the terminal it is examined if the telephone number is stored in the card. If this is the case, the telephone number is picked up from the storage and is also shown on the display 6. If the telephone number is not stored, no display takes place. The display of telephone numbers is advantageous since the telephone number in no other way is visible, neither on the terminal unit or on the card and if a user for example has several cards it may be difficult to remember the number as it is often difficult to remember the own number. This is the case both if one or more telephone numbers is/are connected to stored IMSI-codes.

It is furthermore possible to carry out the storage of different codes (IMSI, PIN) in the storage 3, either manually or automatically. With manual storing it could for example be effected by a so called push button device 5 or similar. Furthermore, it should be possible to change stored codes as well as to delete codes or add codes.

The invention shall of course not be limited to the shown embodiments and does not have to be a mobile telephone but it is related to every device rendering services, e.g. devices for data communication or others comprising a terminal unit and an access unit which e.g. may comprise a subscription or similar and where it is desirable to secure the units forming part of the device against theft and abuse. A device may also comprise more than two units. The invention is limited to the shown embodiments but can be freely varied within the scope of the claims.

I claim:

1. An arrangement for rendering services comprising:
   an access unit having a first access-unit-identification means, said access unit being lockable;
   a terminal unit having storage means for storing a terminal-unit-identification means and for storing a plurality of first access-unit-identification means, said terminal unit being lockable, said terminal unit having comparison means wherein upon start-up of said arrangement and contact between said access unit and said terminal unit, said first access-unit-identification means of said access unit is compared to said first access-unit-identification means of said access unit is compared to said first access-unit-identification means stored in said terminal unit storage means, and correspondence between said first access-unit-identification means of said access unit and at least one of said first access-unit-identification means stored in said terminal unit storage means provides locking up of said terminal unit, and non-correspondence between said first access-unit-identification means of said access unit and said first access-unit-identification means stored in said terminal unit storage means allows a code corresponding to said terminal-unit-identification means to be given,
   wherein said access unit further comprises a second access-unit-identification means and said terminal unit storage means further stores a second access-unit-identification means wherein upon correspondence between said first access-unit-identification means of said access unit and at least one of said first access-unit-identification means stored in said terminal unit storage means, a code corresponding to said second access-unit-identification means stored in said terminal unit storage means is automatically transferred to said second access-unit-identification means of said access unit and use of the arrangement is allowed without requiring a user to manually provide said code.

2. An arrangement for rendering services comprising:
   an access unit having a first access-unit-identification means, said access unit being lockable;
   a terminal unit having storage means for storing a terminal-unit-identification means and for storing a plurality of first access-unit-identification means, said terminal unit being lockable, said terminal unit having comparison means wherein upon start-up of said arrangement and contact between said access unit and said terminal unit, said first access-unit-identification means of said access unit is compared to said first access-unit-identification means stored in said terminal unit storage means, and correspondence between said first access-unit-identification means of said access unit and at least one of said first access-unit-identification means stored in said terminal unit storage means provides locking up of said terminal unit, and non-correspondence between said first access-unit-identification means of said access unit and said first access-unit-identification means stored in said terminal unit storage means allows a code corresponding to said terminal-unit-identification means to be given, wherein said access unit further comprises an activatable second access-unit-identification means, wherein said second access-unit-identification means is not stored in said terminal unit storage means and upon correspondence between said first access-unit-identification means of said access unit and at least one of said first access-unit-identification means stored in said terminal unit storage means, the access unit is locked up by entering a code corresponding to said second access-unit-identification means of said access unit.

3. The arrangement of claim 2 wherein if said first access-unit-identification means of said access unit does not correspond to at least one of said first access-unit-identification means stored in said terminal unit storage means, said second access-unit-identification means is activated and a code corresponding to said second access-unit-identification means must be provided to lock up said terminal unit.

4. The arrangement of claim 3 wherein said code corresponding to said second access-unit-identification means is provided manually by a user.

5. The arrangement of claim 1 wherein upon non-correspondence between said first access-unit-identification means of said access unit and said first access-unit-identification means stored in said terminal unit storage means, said access unit and said terminal unit are locked up upon a user providing a code corresponding to said terminal-unit-identification means.

6. The arrangement of claim 1 wherein upon non-correspondence between said first access-unit-identification means of said access unit and said first access-unit-identification means stored in said terminal unit storage means, said access unit and said terminal unit are locked up upon a user providing both a code corresponding to said terminal-unit-identification means and a code corresponding to a second access-unit-identification means of said access unit.

7. The arrangement of claim 1 wherein said terminal unit comprise a mobile telephone.

8. The arrangement of claim 7 wherein said access unit comprises a Subscriber Identity Module card defining a subscription of said mobile telephone.

9. The arrangement of claim 1 wherein said first access-unit-identification means stored in said terminal unit storage means is stored in a ciphered format.

10. The arrangement of claim 9 wherein said second access-unit-identification means stored in said terminal unit storage means is stored in a ciphered format.

11. The arrangement of claim 9 wherein said first access-unit-identification means stored in said terminal unit storage means is stored automatically.

12. A method for securing the use of an arrangement for rendering services having a terminal unit and at least one access unit, comprising the steps of:

storing a terminal-unit-identification means and a plurality of first access-unit-identification means and second access-unit identification means in said terminal unit; storing at least one first access-unit-identification means and second access-unit-identification means in each said access unit;

contacting said terminal unit to said access unit;

comparing said first access-unit identification means of said access unit to said first access-unit-identification means of said terminal unit and locking up said terminal unit when said first access-unit identification means of said access unit corresponds to at least one of said first access-unit-identification means of said terminal unit;

wherein upon correspondence between said first access-unit-identification means of said access unit and at least one of said first access-unit-identification means stored in said terminal unit, a code corresponding to said second access-unit-identification means stored in said terminal unit is automatically transferred to said second access-unit-identification means of said access unit and use of the arrangement is allowed without requiring a user to manually provide said code.

13. An arrangement for rendering services comprising:

an access unit having a first access-unit-identification means and a second access-unit-identification means, said access unit being lockable;

a terminal unit having storage means for storing a terminal-unit-identification means and for storing a plurality of first access-unit-identification means, said terminal unit being lockable, said terminal unit having comparison means wherein upon start-up of said arrangement and contact between said access unit and said terminal unit, said first access-unit-identification means of said access unit is compared to said first access-unit-identification means stored in said terminal unit storage means, and correspondence between said first access-unit-identification means of said access unit and at least one of said first access-unit-identification means stored in said terminal unit storage means provides locking up of said terminal unit, wherein upon non-correspondence between said first access-unit-identification means of said access unit and said first access-unit-identification means stored in said terminal unit storage means, said access unit and said terminal unit are locked up upon a user providing both a code corresponding to said terminal-unit-identification means and a code corresponding to said second access-unit-identification means of said access unit, and wherein upon correspondence between said first access-unit-identification means of said access unit and said first access-unit-identification means stored in said terminal unit storage means, a code corresponding to said second access-unit-identification means stored in said terminal unit storage means is automatically transferred to said second access-unit-identification means of said access unit and use of the arrangement is allowed without requiring a user to manually provide said code.

* * * * *